United States Patent [19]

Baugher

[11] Patent Number: 5,644,715
[45] Date of Patent: Jul. 1, 1997

[54] SYSTEM FOR SCHEDULING MULTIMEDIA SESSIONS AMONG A PLURALITY OF ENDPOINT SYSTEMS WHEREIN ENDPOINT SYSTEMS NEGOTIATE CONNECTION REQUESTS WITH MODIFICATION PARAMETERS

[75] Inventor: Mark John Baugher, Austin, Tex.

[73] Assignee: International Business Machines Corporation, Armonk, N.Y.

[21] Appl. No.: 353,168

[22] Filed: Dec. 9, 1994

Related U.S. Application Data

[63] Continuation of Ser. No. 796,175, Nov. 22, 1991, abandoned.

[51] Int. Cl.$^6$ ................................................. H01J 13/00
[52] U.S. Cl. ..................... 395/200.04; 395/200.12; 395/200.14
[58] Field of Search ...................... 395/200, 200.14, 395/200.12, 200.04

[56] References Cited

U.S. PATENT DOCUMENTS

| | | | |
|---|---|---|---|
| 4,389,720 | 6/1983 | Baxter et al. | 370/62 |
| 4,455,455 | 6/1984 | Little | 379/203 |
| 4,747,130 | 5/1988 | Ho | 379/269 |
| 4,796,293 | 1/1989 | Blinken et al. | 379/202 |
| 4,841,526 | 6/1989 | Wilson et al. | 371/32 |
| 4,953,159 | 8/1990 | Hayden et al. | 370/62 |
| 5,031,089 | 7/1991 | Liu et al. | 395/725 |
| 5,065,392 | 11/1991 | Sibbitt et al. | 370/58.2 |
| 5,136,581 | 8/1992 | Muehrcke | 370/62 |

FOREIGN PATENT DOCUMENTS

| | | |
|---|---|---|
| 413074 | 2/1991 | European Pat. Off. . |
| 464283 | 1/1992 | European Pat. Off. . |
| 85/00947 | 2/1985 | WIPO . |

OTHER PUBLICATIONS

IBM Technical Disclosure Bulletin vol. 34 No. 4B Sep. 1991. Inter–Client Resource Usage In Distributed Client–Server Presentation Manager System.

IBM Technical Disclosure Bulletin vol. 31 No. 11 Apr. 1989. Managing Serial Use Resources In A Distributed Data Processing System Using An Insertion Ring.

Vin et al, "Multimdia Conferencing in the Etherphone Environment", IEEE Computer, pp. 69–79, Oct. 1991.

*Primary Examiner*—Thomas C. Lee
*Assistant Examiner*—Sang Hui Kim
*Attorney, Agent, or Firm*—Mark S. Walker; L. Keith Stephons

[57] ABSTRACT

A multimedia computer system for scheduling and coordinating distributed multimedia resources is disclosed. The scheduling and coordinating are accomplished by the operation of an algorithm in the memory of a number of networked computers. The processor, under the control of the algorithm, creates, accesses, modifies and stores a plurality of data structures in a file on a non-volatile store such as a disk. The data structures store user inputs defining the parameters associated with multimedia sessions and the scheduling information necessary to support the requirements of the sessions with a specific Quality Of Service (QOS). This information is stored on each of the computers participating in the electronic meeting for subsequent use in scheduling and implementing the sessions via an Open System Interconnect (OSI) network for example.

15 Claims, 5 Drawing Sheets

SYSTEM FOR SCHEDULING MULTIMEDIA SESSIONS AMONG A PLURALITY OF ENDPOINT SYSTEMS WHEREIN ENDPOINT SYSTEMS NEGOTIATE CONNECTION REQUESTS WITH MODIFICATION PARAMETERS

This is a continuation of application Ser. No. 07/796,175 filed Nov. 22, 1991, now abandoned.

FIELD OF THE INVENTION

The present invention relates to data processing systems, and in particular to scheduling multimedia resources in a manner which optimizes system performance.

BACKGROUND OF THE INVENTION

It is known for self-contained computer workstations to be interconnected by a digital network. One advantage of such a network is that users of individual workstations can communicate with one another over the network, for example by means of a typed note, a data file or a program file transmitted to another user. More recently, users have increasingly requested desktop conferencing, remote presentations and other multimedia applications between networked users. However, multimedia applications require high bandwidth communication links between distributed computing systems with minimal communication delay, maximum throughput, and instantaneous burst communication capability. The requirements of multimedia applications make scheduling the appropriate resources difficult.

IBM Technical Disclosure Bulletin (TDB), number 4b, September, 1991, pp. 416–417, *Inter-client Resource Usage in Distributed Client Server Presentation Manager System*, discloses a distributed client-server presentation system. In such a system, resources, such as cut and paste clipboard, the keyboard, the mouse, etc., are managed across a number of client systems each connected to a display server. The resources are managed by providing generic server functions, neutral to any specific client policies. The Server provides inter-client resource support by managing named "logical resources". Clients use these to assign global ownership. For example, assuming a client system, a "FOCUS" resource is created and ownership is acquired by client nodes which require a focus window to receive keyboard input events. The Client requests a resource by name and can request exclusive or shared access. Data can also be associated with a logical resource.

Another IBM TDB, Apr. 4, 1989, p. 349, *Managing Serial Use Resources in a Distributed Data Processing System Using an Insertion Ring*, discloses a technique which insures that users of serial facilities in a distributed data processing system are properly sequenced. U.S. Pat. No. 5,031,089; *Dynamic Resource Allocation Scheme for Distributed Heterogeneous Computer Systems*; discloses a similar system for a plurality of networked computer nodes to reallocate system resources for optimized job performance. U.S. Pat. No. 4,747,130; *Resource Allocation In Distributed Control Systems*; discloses a similar scheduling system for a distributed process control system.

U.S. Pat. No. 4,953,159; *Audiographics Conferencing Arrangement*; discloses a system for allowing conferees to exchange displayed text and/or graphics stored locally in their respective data terminals. The conferees may change the displayed text and/or graphics and such changes are automatically distributed to the other data terminals so that all of the conferees view the same information. U.S. Pat. No. 4,389,720; *Distributed Digital Conferencing System*; discloses a time division communication system for combining those samples going to a particular station forming a conference with combinations of selected time slot samples into a conference sum unique to the station. However, none of the prior art references provide an effective approach for scheduling and coordinating distributed multimedia resources.

SUMMARY OF THE INVENTION

According to the present invention there is provided a data processing system for scheduling and coordinating distributed, networked multimedia resources.

These and other objects of the present invention are accomplished by the operation of an algorithm in the memory of a number of networked computers. The processor, under the control of the algorithm, creates, accesses, modifies and stores a plurality of data structures employing a disk, memory and communication network. The data structures capture user inputs defining the parameters associated with the multimedia sessions and the scheduling information necessary to support the requirements of the electronic meeting. This information is stored on each of the computers participating in the electronic meeting for subsequent use in scheduling and implementing the electronic meeting.

DETAILED DESCRIPTION OF THE INVENTION

Figure 1:
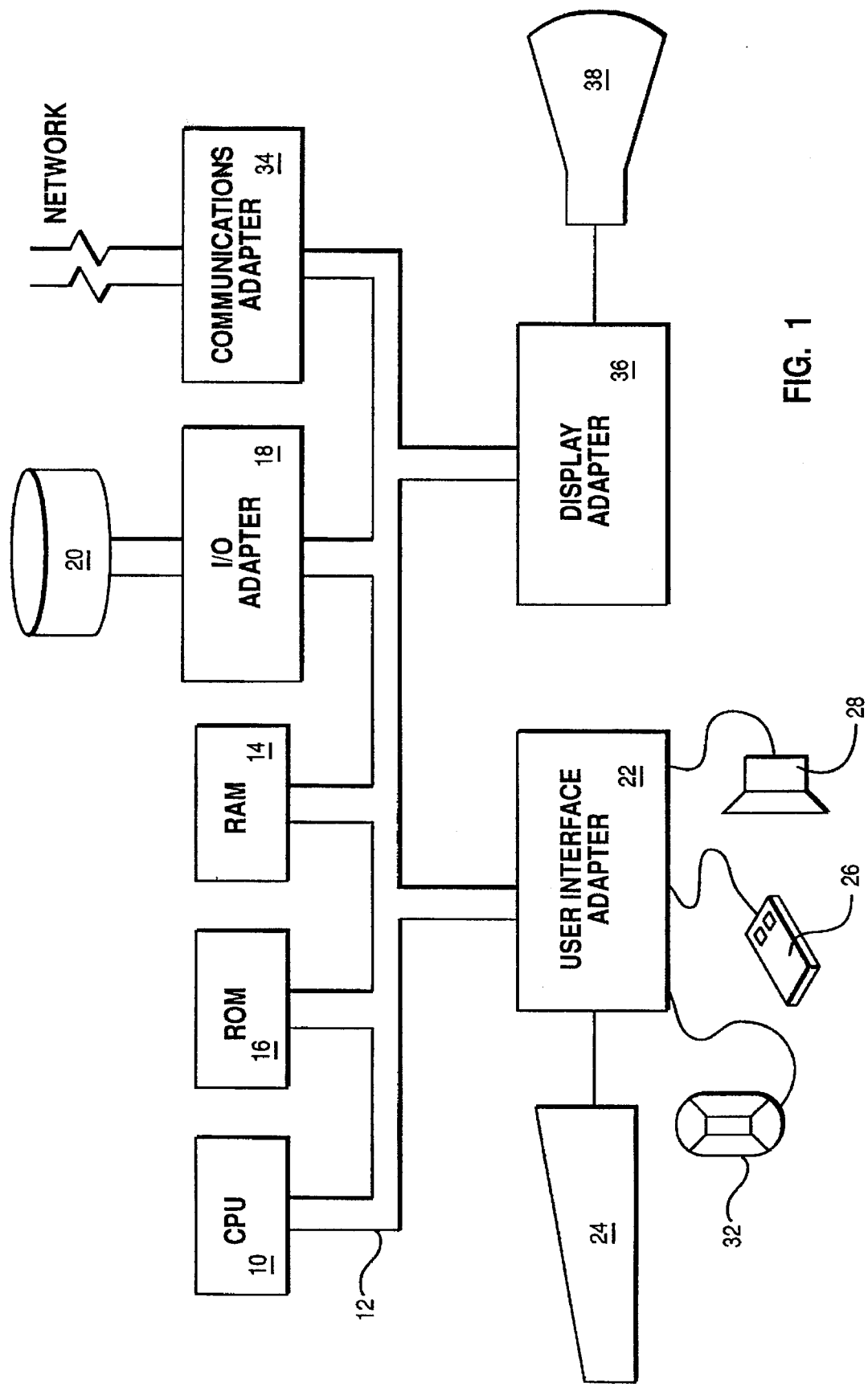
FIG. 1 is a block diagram showing the configuration of a typical workstation in accordance with the subject invention.

Refer now to FIG. 1, which illustrates a typical hardware configuration of a workstation with a central processing unit 10, such as a conventional microprocessor, and a number of other units interconnected via a system bus 12. The workstation shown in FIG. 1 includes a random access memory (RAM) 14, read only memory (ROM) 16, an I/O adapter 18 for connecting peripheral devices such as disk units 20 to the bus, a user interface adapter 22 for connecting a keyboard 24, a mouse 26, a loudspeaker 28, a microphone 32, and/or other user interface devices such as a touch screen device (not shown) to the bus, a communication adapter 34 for connecting the workstation to a data processing network and a display adapter 36 for connecting the bus to a display device 38.

Although FIG. 1 shows a typical 'intelligent' workstation, a workstation may in fact be a dumb terminal with only a limited processing capability, under the control of a host processor. This will be made clear in connection with FIG. 2.

Figure 2:
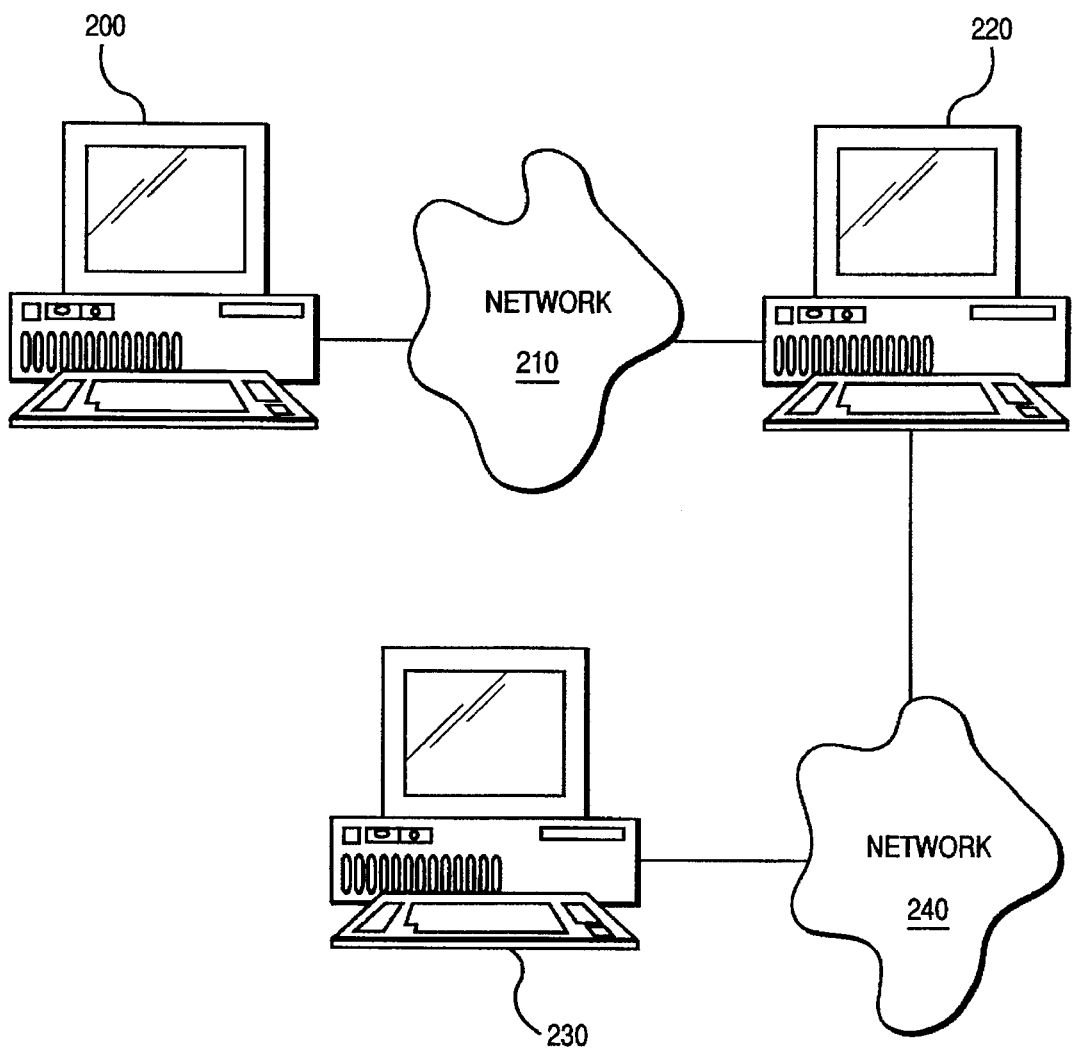
FIG. 2 is a schematic diagram of a data processing system including three workstations interconnected by a network in accordance with the subject invention.

FIG. 2 illustrates a data processing system comprising a number of workstations (here, three workstations 200, 220 and 230) interconnected via a pair of data networks 210 and 240 so as to permit communication between the workstations. It is assumed that the data processing system shown in FIG. 2 is of a type which will permit concurrent real time communication between the users. The network operates according to a conventional network protocol, such as the token ring protocol.

FIG. 2 shows just one possible hardware configuration for a data processing network. Other configurations are possible. For example, the data processing system could be based upon a star network, or based upon a host processor connected to a plurality of dumb terminals, or based upon a plurality of remote processors connected by a communication network. The networks could also be based upon the telephone network, an ISDN network or any other 'dial up' networks. The workstations would be located within a single workspace, or within a local area (e.g. in a building), or could be remote from one another. An excellent source of detailed technical planning information for configuring a network of workstations in accordance with the invention is the IBM Extended Services For OS/2 Example Scenarios Manual (1991). The document is incorporated by reference in its entirety.

Multimedia computing is the processing of various medias such as video, waveform audio, musical instrument digital interface (MIDI) streams, animation, graphics and text. Media processing includes the capture, authoring (editing) and playback of media streams as well as other data processing applications. Multimedia documents which are stored on some non-volatile medium, such as a disk, are referred to as canned multimedia applications. There are also live multimedia applications in which two or more people communicate with each other at the same time using a computer. Live multimedia applications are normally conducted across space and time indicating that live multimedia is inherently distributed. Even canned multimedia applications require distributed file system services to share large volumes of stored media such as video disk, audio information or computer generated images. Thus, it is critical that a scheduling and coordination solution for multimedia applications include support for a distributed environment.

To reduce their design complexity, most networks are organized as a series of layers, each one built upon its predecessor as described in *Computer Networks*, Tannenbaum, Andrew S., Prentice Hall (1988). The number of layers, the name of each layer, the contents of each layer, and the function of each layer differ from network to network. However, in each network, the purpose of the layers is to offer certain services to the higher layers, shielding those layers from the details of how the offered services are actually implemented. The purpose, function and details of each of the layers and their interaction is set forth in Tannenbaum's book and familiar to communication programmers the world over.

The transport layer accepts data from the session layer, splits it up into smaller units and passes the units to the network layer to ensure that the pieces all arrive at the other end. Details of the transport layer and how it fits into the OSI architecture are shown in FIG. 1–8 of Tannenbaum's book and described in the surrounding pages. One way of looking at the transport layer is to regard its primary function as enhancing the Quality of Service (QOS) provided by the network layer. If the subject invention's network reservation service is functioning properly, then the transport service has an easy task. However, if the network service deteriorates, then the transport layer has to intervene to shore up communication services and avoid impact to the network users.

QOS can be characterized by a number of specific parameters. The OSI transport service allows a user to specify preferred, acceptable, and unacceptable values for these parameters when a connection is made. Some of the parameters also apply to connectionless transport. The transport layer examines the parameters, and depending on the kind of network services available to it, determine whether the transport layer can provide the necessary service. QOS parameters are:

Connection Delay

The amount of elapsed time between a transport connection being requested and confirmation being received by the user. As with all parameters dealing with delay, the shorter the delay, the better.

Connection Establishment Failure Probability

The probability of a connection not being established within the maximum establishment delay time. Network congestion, lack of table space, and other internal problems will affect this value.

Throughput

Measures the number of bytes of user data transferred per second as measured over a recent time interval. The throughput is measured separately for each direction.

Transit Delay

Measures the time between a message being sent by the transport user on the source machine and its being received by the transport user on the destination machine.

Residual Error Rate

Measures the number of lost or garbled messages as a fraction of the total sent in the sampling period. In theory, the residual error rate should be equal to zero, since it is the job of the transport layer to hide all network layer errors.

Transfer Failure Probability

Measures how well the transport service is living up to its assigned tasks. When a transport connection is established, a given level of throughput, transit delay, and residual error are agreed upon. The transfer failure probability gives the fraction of times that these agreed upon goals were not met during some time period.

Connection Release Delay

The amount of time elapsing between a transport user initiating a release of a connection, and the actual release happening at the end.

Connection Release Failure Probability

The fraction of connection release attempts that did not complete within the agreed upon connection release delay interval.

Protection

Provides a way for the transport user to specify interest in having the transport layer provide protection against unauthorized third parties reading or changing transmitted information.

Priority

Provides a way for a transport user to indicate that some of its connections are more important than other ones.

Resilience

Gives the probability of the transport layer spontaneously terminating a connection due to internal problems or congestion.

The QOS parameters are specified by the transport user when a connection is requested. Both the desired, minimum and maximum acceptable values are given. In some cases the transport layer immediately recognizes that the values are not achievable. When this occurs, the communication attempt fails and an appropriate exception is noted.

In other cases, the transport layer knows that it cannot achieve the desired goal, but it can achieve a lower, but still acceptable rate. The lower rate, minimum acceptable rate, and maximum acceptable rate are sent to the remote machine requesting the establishment of a connection. If the remote machine cannot handle the proposed value, but can handle a value above the minimum or below the maximum, then it may lower the parameter to its value. If it cannot handle any value above a minimum, then it rejects the connection attempt. Then, the originating transport user is informed of whether the connection was established or rejected.

This process is called open negotiation. Once the options have been negotiated, they remain that way through the life of the connection. The OSI Transport Service Definition (ISO 8072) does not specify the QOS parameter values. These are normally agreed upon by the carrier and the customer. A T-Connect request is employed to initialize communication and the QOS is specified as part of this transaction. Details on the transport primitives are found in the aforementioned reference which is incorporated herein by reference.

Electronic meetings that are held across a distributed system require computer and network resources be reserved hours or days in advance. An advanced reservation system is needed to invoke the OSI services to perform a QOS reservation for a certain hour of a certain day for a fixed duration of time. The invention stores the requirements for a particular session including the QOS parameters, time of the connection, day of the connection, duration of the connection and various users that must be connected in a file on each of the connected user's computers 200, 220 and 230 of FIG. 2. The file is stored in non-volatile memory to avoid problems with power outs.

A scheduled connection is necessary since hours or days may elapse between when an electronic meeting is scheduled and when the network and computer resources must be reserved. A persistent connection must be established since a fault may occur during the time that the electronic meeting is scheduled. The transport application, transport service, computer workstation(s) or network could stop and be restarted many times during the interim. A transient fault should not impair a future connection so long as all resources are operational when data transfers are scheduled to begin. The invention stores all necessary state information for a connection in a non-volatile medium as described earlier and employs recovery logic to reinitiate communication should a problem occur. In addition to recovery, scheduling and notification must occur.

Detailed Logic

Scheduling

Figure 3:
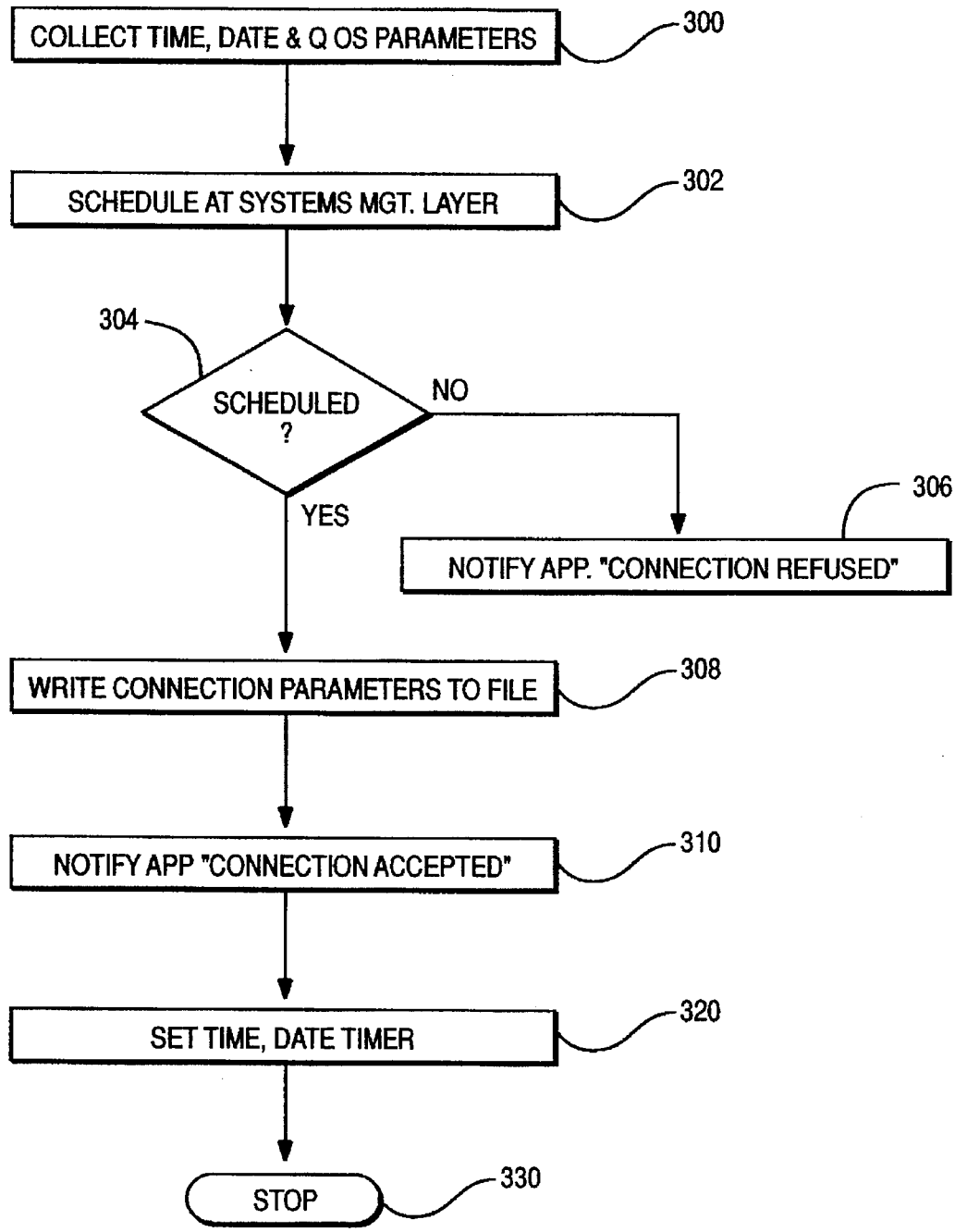
FIG. 3 is a flow diagram of the logic in accordance with the subject invention.

FIG. 3 is a flowchart of the scheduling logic in accordance with the subject invention. Control commences at function block 300 where the time, data and QOS parameters are collected for the application. These can be values pre-coded or prompted entries from a user. An attempt is made to schedule the upcoming connection via the Systems Management Layer of OSI as shown in function block 302. A test is performed at decision block 304 to determine if the connection was successfully scheduled and to assure the resources will be available. If the session was not scheduled, then an appropriate exception message is logged and the application notified as shown in function block 306. However, if the session was scheduled, then the connection values are stored in a file on disk or other non-volatile storage medium as shown in function block 308. Then, the application is notified as depicted in function block 310, the time and date timer are set and activated as shown in function block 320, and control is returned to the application in terminal 330.

Recovery

Figure 4:
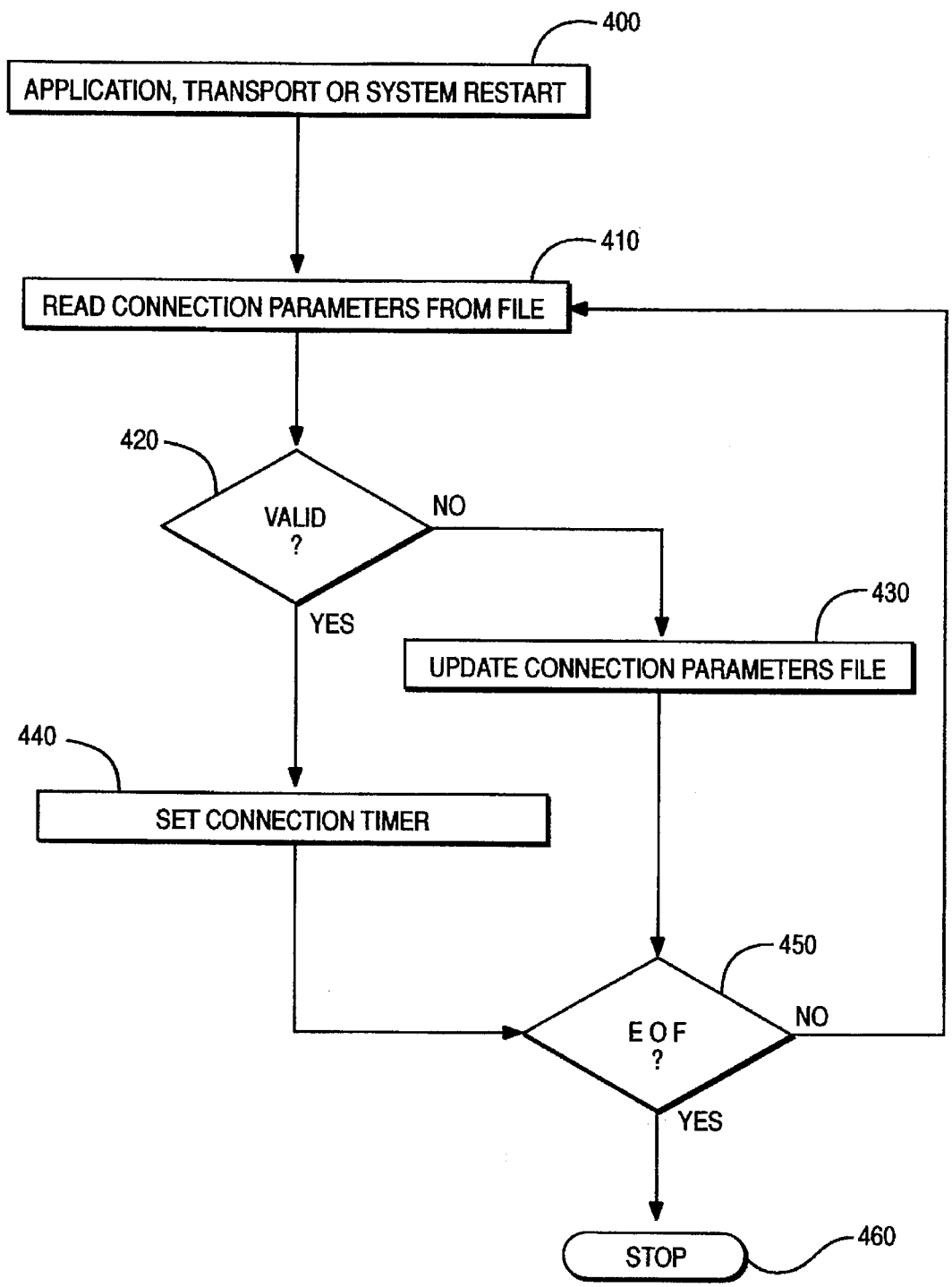
FIG. 4 is a flow diagram of the logic in accordance with the subject invention.

FIG. 4 is a flowchart of the recovery logic in accordance with the subject invention. Control commences at function block 400 when an application transport or system restart is detected. Then, in function block 410, the connection parameters are read from the file and checked for validity as shown in function block 420. If they are valid, then the connection timer is set as depicted in function block 440 and an end of file marker is checked in decision block 450. If the end of file is detected, then control is returned to the application in terminal 460. If the end of file is not detected, then control passes to function block 410 to read the next connection parameters from the file. If the connection parameters were not valid, then the application is prompted to update the connection parameter file as indicated in function block 430 and an end of file check is performed in decision block 450 to determine if the file has been exhausted of all the sessions to commence. If there are no more sessions to start, then control returns to the calling application as shown in terminal 460. Else, if there are additional sessions to process, then control passes back to function block 410 for processing the additional sessions.

Notification

Figure 5:
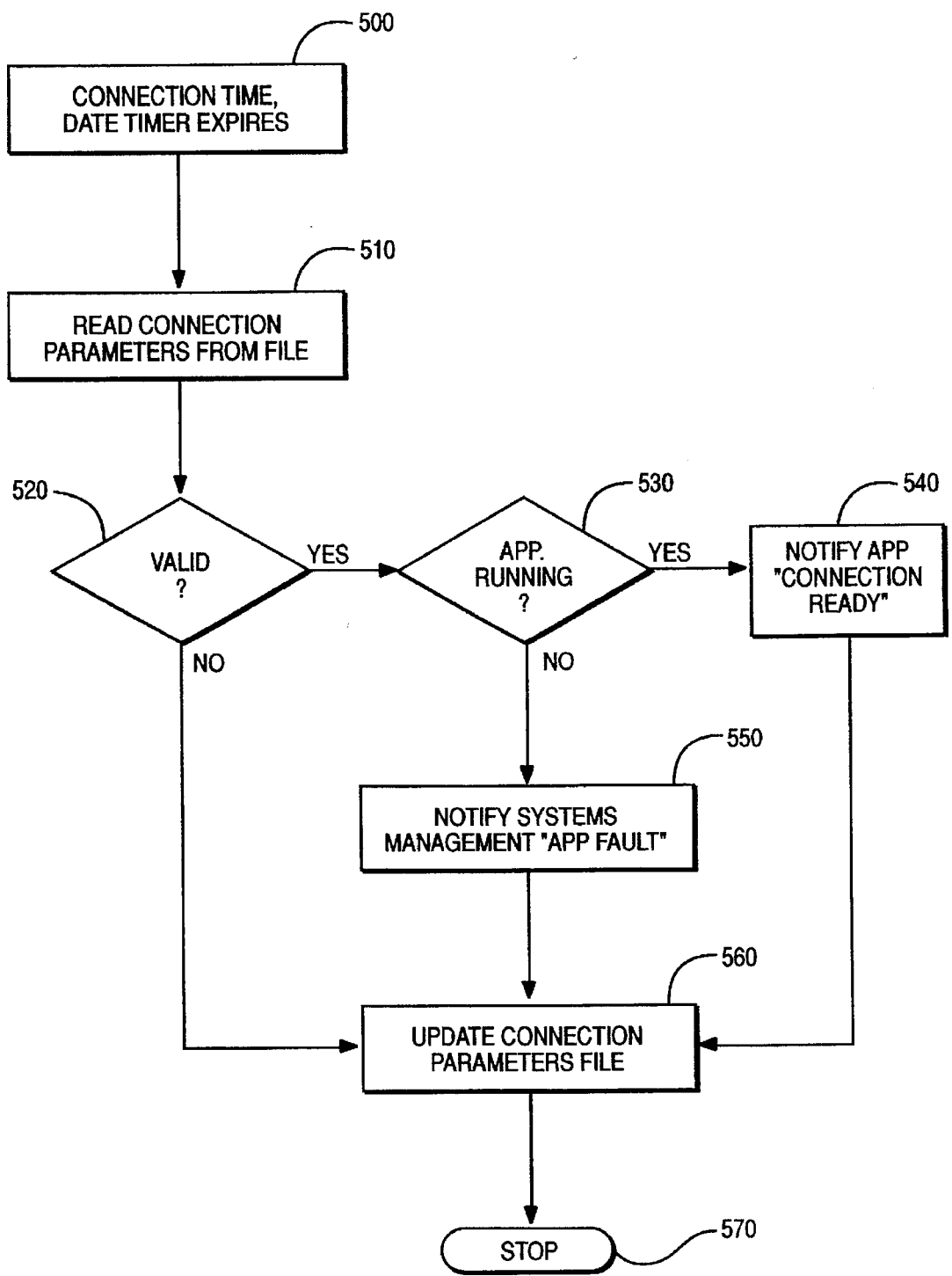
FIG. 5 is a flow diagram of the logic in accordance with the subject invention.

FIG. 5 is a flowchart of the notification logic in accordance with the subject invention. Control commences at function block 500 when a connection time or date timer expires. Then, the connection parameters from the file contained in the non-volatile store are read as shown in function block 510 and a test is made in decision block 520 to assess the validity of the parameters. If the parameters are valid, then a test is performed in decision block 530 to determine if the application connection is already active. If the connection is currently active, then the application is notified that the connection is ready in function block 540, the parameters file is updated in function block 560, and control is returned to the calling application in terminal block 570. If the parameters were not valid in decision block 520, then the connection parameters file is updated in function block 560 and control is passed back to the calling application as indicated by terminal block 570. If the connection parameters were valid in decision block 520, and the application session was not currently active at decision block 530, then the systems management is notified that an application fault was detected at function block 550, the connection parameters are updated in function block 560 and control is returned to the calling application as indicated in terminal block 570.

Example in Accordance with the Subject Invention

Refer to FIG. 2 once more. A connection file is created at each of the computers 200, 220, and 230. The connection file is stored on the disk shown in FIG. 1 at 20 in this embodiment. However, one skilled in the art will recognize that a non-volatile store can be readily substituted if it is installed on each of the communication adapters. The connection file contains the QOS items associated with the connection, including a date and time to commence the connection, duration of the connection, and connection information file name. The date and time in this case are for Nov. 15, 1991 at 3:00 pm. Thus, at Nov. 15, 1991 at 3:00 pm, computer 200 will have a connection with computer 230. The connection will be routed through computer 220. Resources for the connection are reserved in advance at all three computers via calls to the transport layer with the QOS parameters stored in the files.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what I claim as new, and desire to secure by Letters Patent is:

1. An apparatus for scheduling a multimedia session between at least two of a plurality of end-point computer systems, comprising:

(a) first means for receiving a user generated session connection request in each of said plurality of computers, said request including a specification of others of said plurality of end-point computer systems to connect, a plurality of quality of Service parameters and a session time;

(b) requesting network connection means in said receiving one of said plurality of computers, said requesting network connection means transmitting a network connection reservation request across said network in response to said session connection request, receiving a connection response from said other end-point computer systems and accepting or rejecting a response containing a connection parameter modification;

(c) receiving network connection means in each of said other end-point computer systems, said receiving network connection means receiving said network connection request, testing whether or not said end-point computer system is available and whether or not it can to satisfy said quality of service parameters, and generating a connection response with a connection rejection, connection acceptance, or a provisional connection acceptance with modified connection parameters;

(d) storage means for storing in each of said plurality of computers participating in said session network connection the reservation information for each accepted connection including the quality of service parameters and the session time; and , (e) means in each of said plurality of computers for reading the stored network connection reservation information for the multimedia session and commencing the multimedia session at the session time.

2. An apparatus as recited in claim 1, wherein said first means for receiving includes means for prompting a user to enter quality of service parameters.

3. An apparatus as recited in claim 2, in which the stored network connection information includes default parameters for any parameters not entered by the user.

4. An apparatus as recited in claim 1, in which the network is an open system interconnect network.

5. An apparatus as recited in claim 1, in which the network is a local area network.

6. An apparatus as recited in claim 1, in which the network is an integrated systems distributed network.

7. An apparatus as recited in claim 1, including means for initiating one or more multimedia sessions.

8. An apparatus as recited in claim 7, including means for recovering one or more multimedia sessions.

9. A method for scheduling a multimedia session including a plurality of end point computers connected by a network, comprising the steps of:

(a) receiving a user generated session connection request in any one of said plurality of end point computers including a plurality of quality of service parameters and a session time;

(b) negotiating between said plurality of end point computers to establish connection reservation between two or more of said plurality of computers in response to said session connection request, said negotiating including sending a request with communication parameters from said any one end-point computer, receiving said request by said other end-point computers, testing other end point computer resource availability and responding by said other end point computers with an acceptance message, rejection message or provisional acceptance with communication parameter modification message, and replying by said first end point computer with an acceptance message or a rejection message if said other computer response is a communication parameter modification message;

(c) storing network connection reservation information including the quality of service required for the multimedia session in each of said two or more computers; and (d) reading the stored network connection reservation information for the multimedia session and commencing the multimedia session at the session time.

10. A method as recited in claim 9, including the step of prompting a user to enter quality of service parameters.

11. A method as recited in claim 9, including the step of storing default quality of service parameters for any parameters not entered by the user.

12. A method as recited in claim 9, in which the step of establishing a network connection reservation includes the step of negotiating for network resources.

13. An apparatus as recited in claim 9, including the step of initiating one or more multimedia sessions.

14. A method as recited in claim 13, including the step of recovering one or more multimedia sessions.

15. A control element for directing the operation of a computer and initiating a multimedia session, having storage means for retaining signals recognizable by the computer and controlling the operation thereof, the signals comprising:

(a) means for use with the computer to receive a user generated session connection request including a plurality of quality of service parameters and a session time;

(b) means for use with the computer to establish a network connection reservation with at least a second computer in response to said session connection request, said first computer sending a reservation request having reservation parameters and said second computer responding with an acceptance, rejection or provisional acceptance with reservation parameter modification depending on said second computer resource availability, said first computer responding with acceptance or rejection of any reservation parameter modification request;

(c) means for use with the computer and the at least second computer to store network connection reservation information for the multimedia session; and (d) means for use with the computer and the at least second computer to read the stored network connection reservation information for the multimedia session and commence the multimedia session at the session time.

* * * * *